United States Patent
Lee et al.

(10) Patent No.: US 12,533,040 B2
(45) Date of Patent: Jan. 27, 2026

(54) NON-CONTACT IMAGE-BASED BLOOD PRESSURE MEASUREMENT METHOD AND SYSTEM BASED ON ADVANCED VISUAL INTELLIGENCE

(71) Applicant: INDUSTRY ACADEMIC COOPERATION FOUNDATION KEIMYUNG UNIVERSITY, Daegu (KR)

(72) Inventors: Jong-Ha Lee, Daegu (KR); Beomjoon Kim, Daegu (KR); Dae Jin Jang, Daegu (KR)

(73) Assignee: INDUSTRY ACADEMIC COOPERATION FOUNDATION KEIMYUNG UNIVERSITY, Daegu (KR)

( * ) Notice: Subject to any disclaimer, the term of this patent is extended or adjusted under 35 U.S.C. 154(b) by 314 days.

(21) Appl. No.: 18/274,942

(22) PCT Filed: Feb. 4, 2022

(86) PCT No.: PCT/KR2022/001786
§ 371 (c)(1),
(2) Date: Jul. 28, 2023

(87) PCT Pub. No.: WO2022/169312
PCT Pub. Date: Aug. 11, 2022

(65) Prior Publication Data
US 2024/0108235 A1 Apr. 4, 2024

(30) Foreign Application Priority Data
Feb. 5, 2021 (KR) .................. 10-2021-0016766

(51) Int. Cl.
*A61B 5/026* (2006.01)
*A61B 5/00* (2006.01)
(Continued)

(52) U.S. Cl.
CPC ........ *A61B 5/0261* (2013.01); *A61B 5/02108* (2013.01); *A61B 5/7246* (2013.01);
(Continued)

(58) Field of Classification Search
CPC . A61B 5/0261; A61B 5/02108; A61B 5/7246; A61B 5/7275; A61B 5/4887;
(Continued)

(56) References Cited

U.S. PATENT DOCUMENTS

2016/0220194 A1* 8/2016 Kang .................. A61B 5/7278
2018/0085066 A1* 3/2018 Jinnouchi ............ A61B 5/1118
(Continued)

FOREIGN PATENT DOCUMENTS

JP 2014198200 A 10/2014
KR 20070056925 A 6/2007
(Continued)

OTHER PUBLICATIONS

International search report of PCT/KR2022/001786, May 16, 2022, English translation.
(Continued)

*Primary Examiner* — Baisakhi Roy
(74) *Attorney, Agent, or Firm* — STIP Law Group, LLC

(57) ABSTRACT

Proposed are a non-contact image-based blood pressure measurement method and system based on advanced visual intelligence, wherein a blood pressure measurement model is created by performing neural network training with an image sequence obtained by a webcam in a non-contact manner, and the blood pressure of a measurement subject is estimated with the blood pressure measurement model.

Accordingly, since the webcam for obtaining a video, that is, an image sequence, in a non-contact manner is used, blood pressure is continuously estimated during the recording with the webcam without contact with a device or another person, and blood pressure is estimated just by being in front of the webcam, so the system is easy to use, inexpensive, and secures sufficient precision by using a neural network algorithm.

12 Claims, 10 Drawing Sheets

(51) Int. Cl.
| | |
|---|---|
| *A61B 5/021* | (2006.01) |
| *G06V 10/25* | (2022.01) |
| *G06V 10/60* | (2022.01) |
| *G16H 30/20* | (2018.01) |
| *G16H 30/40* | (2018.01) |
| *G16H 50/30* | (2018.01) |
| *G16H 50/70* | (2018.01) |

(52) U.S. Cl.
CPC ............ *A61B 5/7275* (2013.01); *G06V 10/25* (2022.01); *G06V 10/60* (2022.01); *G16H 30/20* (2018.01); *G16H 30/40* (2018.01); *G16H 50/30* (2018.01); *G16H 50/70* (2018.01)

(58) Field of Classification Search
CPC .............. A61B 2576/00; A61B 5/0082; A61B 5/02116; A61B 5/02125; A61B 5/7267; A61B 5/0002; A61B 5/7264; G06N 3/04; G06N 3/08; G06N 3/042
See application file for complete search history.

(56) References Cited

U.S. PATENT DOCUMENTS

| | | | |
|---|---|---|---|
| 2018/0199870 A1* | 7/2018 | Lee | G16H 40/63 |
| 2019/0110698 A1* | 4/2019 | Ko | G16H 40/63 |
| 2019/0223737 A1* | 7/2019 | Tzvieli | G02B 27/017 |
| 2019/0313915 A1* | 10/2019 | Tzvieli | G01J 5/12 |
| 2020/0090819 A1* | 3/2020 | Durduran | G16H 50/30 |
| 2020/0113442 A1* | 4/2020 | Yuan | A61B 5/0022 |
| 2021/0068678 A1* | 3/2021 | Ogawa | A61B 5/0022 |
| 2022/0104715 A1* | 4/2022 | Ogawa | A61B 5/02108 |
| 2024/0049970 A1* | 2/2024 | Matsumura | A61B 5/02108 |

FOREIGN PATENT DOCUMENTS

| | | |
|---|---|---|
| KR | 20160107007 A | 9/2016 |
| KR | 20190050725 A | 5/2019 |
| KR | 20200139047 A | 12/2020 |

OTHER PUBLICATIONS

Ming-Zher Poh et al, Advancements in Noncontact, Multiparameter Physiological Measurements Using a Webcam, Biomedical Engineering, Jan. 2011, vol. 58, No. 1, IEEE, Piscataway, NJ, USA.

\* cited by examiner

NON-CONTACT IMAGE-BASED BLOOD PRESSURE MEASUREMENT METHOD AND SYSTEM BASED ON ADVANCED VISUAL INTELLIGENCE

CROSS-REFERENCE TO RELATED APPLICATIONS

This application is the U.S. National Phase under 35 U.S.C. § 371 of International Application No. PCT/KR2022/001786, filed on Feb. 4, 2022, which in turn claims the benefit of Korean Application No. 10-2021-0016766, filed on Feb. 5, 2021, the disclosures of which are incorporated by reference into the present application.

TECHNICAL FIELD

The present disclosure relates to a blood pressure measurement method and system and, more particularly, to a non-contact image-based blood pressure measurement method and system based on advanced visual intelligence.

BACKGROUND ART

Blood pressure refers to the pressure exerted by the blood on the walls of blood vessels as it flows through the blood vessels. Hypertension is a condition in which blood pressure is significantly higher than normal for individuals of the same age, while hypotension is a condition in which blood pressure is significantly lower. Generally, people with the lowest blood pressure of 90 mmHg or above are candidates for treatment. Ignoring hypertension may lead to life-threatening diseases such as cerebral hemorrhage. As such, blood pressure is an indicator for determining whether to treat hypertension or hypotension patients, as well as an important physiological indicator including a lot of information on cardiac output, blood vessel elasticity, and physiological changes of patients, so it is necessary to measure and monitor blood pressure regularly.

FIG. 1 is a diagram illustrating an example of conventional blood pressure measurement. As shown in FIG. 1, an auscultatory method of measuring blood pressure using Korotkoff sound is the most representative blood pressure measurement method in the related art. However, the conventional blood pressure measurement method needs to apply pressure to a user using a cuff for measurement, which is inconvenient and is unable to perform continuous measurement.

Therefore, in order to overcome the drawbacks of the conventional blood pressure measurement method as described above, a method of continuously measuring blood pressure using photoplethysmographic signals has recently been studied. Research has shown that a blood pressure measurement technology based on a photoplethysmograph has several advantages over the conventional blood pressure measurement using a cuff. In one study, photoplethysmographic signals simultaneously recorded from the fingers of both hands were used to estimate blood pressure values, wherein measurement was performed using pulse transit time (PTT).

However, according to this method, in order to measure blood pressure, it is necessary to have a photoplethysmograph at home and wear the photoplethysmograph on the extremity of the body, which is inconvenient. Therefore, there is a need for the development of a more user-friendly and cost-effective blood pressure measurement method with sufficient precision.

In the meantime, as a related art of the present disclosure, disclosed is Korean Patent Application Publication No. 10-2007-0056925 (titled: BLOOD PRESSURE MEASURING METHOD AND APPARATUS, publication date: 4 Jun. 2007).

DISCLOSURE

Technical Problem

The present disclosure has been made keeping in mind the above problems occurring in the previously proposed methods, and the present disclosure is directed to providing a non-contact image-based blood pressure measurement method and system based on advanced visual intelligence, wherein the system creates a blood pressure measurement model by performing neural network training with an image sequence obtained by a webcam in a non-contact manner and estimates the blood pressure of a measurement subject with the blood pressure measurement model. Accordingly, since the system uses the webcam for obtaining a video, that is, an image sequence, in a non-contact manner, blood pressure is estimated continuously during the recording with the webcam without contact with a device or another person. In addition, blood pressure is estimated just by being in front of the webcam, so the system is easy to use, inexpensive, and secures sufficient precision by using a neural network algorithm.

Technical Solution

In order to achieve the above objective, according to an aspect of the present disclosure, there is provided a non-contact image-based blood pressure measurement method based on advanced visual intelligence, the non-contact image-based blood pressure measurement method including the steps, each performed by a computer, of:
(1) creating a blood pressure measurement model based on a neural network using an image sequence obtained by a webcam in a non-contact manner; and
(2) receiving an image sequence of a measurement subject obtained by the webcam, and using the blood pressure measurement model created in the step (1) to estimate blood pressure of the measurement subject,
the step (1) includes:
(1-1) collecting the image sequence obtained by the webcam in a non-contact manner and storing the image sequence in a database;
(1-2) extracting pulse wave from the image sequence stored in the database;
(1-3) extracting feature values from the extracted pulse wave; and
(1-4) performing neural network training using the extracted feature values, and creating the blood pressure measurement model for predicting blood pressure from the feature values.
Preferably, the blood pressure measurement model is created by performing neural network training on a long short-term memory (LSTM) recurrent neural network (RNN).
Preferably, the feature values extracted in the step (1-3) include
at least two selected from a group of a systolic amplitude, a pulse interval, a systolic slope, a diastolic slope, a peak interval, a pulse wave rise time, and a pulse wave fall time.

Preferably, in the step (1-1), blood pressure measured while the image sequence is collected with the webcam is collected, and the image sequence and the blood pressure are matched and stored as training data in the database.

More preferably, in the step (1-4), supervised learning is performed with the training data stored in the database, and using the feature values extracted from the image sequence as input data and using the blood pressure as output data, the blood pressure measurement model is created by performing neural network training so that a correlation between the feature values and the blood pressure is understood.

Preferably, in the step (1-2), a pulse wave signal is extracted from the image sequence, and the pulse wave signal is extracted from a region of interest included in the image sequence.

More preferably, the step (1-2) includes:

(1-2-1) detecting the region of interest for extracting an optical signal from the image sequence;

(1-2-2) detecting the optical signal reflecting off the detected region of interest, for each individual image constituting the image sequence;

(1-2-3) converting the detected optical signal into electric charge;

(1-2-4) calculating a subcutaneous blood flow change from a signal resulting from conversion into the electric charge; and (1-2-5) converting the subcutaneous blood flow change into a frequency signal and outputting the frequency signal as the pulse wave signal.

More preferably, in the step (1-2-1), the region of interest is detected using a detection model trained on the basis of an artificial intelligence algorithm to detect regions of interest for pulse wave signal extraction from images of people.

In order to achieve the above objective, according to an aspect of the present disclosure, there is provided a non-contact image-based blood pressure measurement system based on advanced visual intelligence, the non-contact image-based blood pressure measurement system includes:

a webcam configured to obtain an image sequence in a non-contact manner;

a learning part configured to create a blood pressure measurement model based on a neural network using the image sequence obtained by the webcam; and a prediction part configured to receive an image sequence of a measurement subject obtained by the webcam, and use the blood pressure measurement model created by the learning part to estimate blood pressure of the measurement subject, wherein the learning part includes:

a data collection module configured to collect the image sequence obtained by the webcam in a non-contact manner and store the image sequence in a database;

a pulse wave extraction module configured to extract pulse wave from the image sequence stored in the database;

a feature extraction module configured to extract feature values from the extracted pulse wave; and a model creation module configured to perform neural network training using the extracted feature values, and create the blood pressure measurement model for predicting blood pressure from the feature values.

Preferably, the blood pressure measurement model is created by performing neural network training on a long short-term memory (LSTM) recurrent neural network (RNN).

Preferably, the feature values extracted by the feature extraction module include at least two selected from a group of a systolic amplitude, a pulse interval, a systolic slope, a diastolic slope, a peak interval, a pulse wave rise time, and a pulse wave fall time.

Preferably, the data collection module is configured to collect blood pressure measured while the image sequence is collected with the webcam, and match and store the image sequence and the blood pressure as training data in the database.

More preferably, the model creation module is configured to perform supervised learning with the training data stored in the database, and create the blood pressure measurement model by performing neural network training so that a correlation between the feature values and the blood pressure is understood, with the feature values extracted from the image sequence as input data and with the blood pressure as output data.

Preferably, the pulse wave extraction module is configured to extract a pulse wave signal from the image sequence, and extract the pulse wave signal from a region of interest included in the image sequence.

More preferably, the pulse wave extraction module is configured to follow the steps of (1-2-1) detecting the region of interest for extracting an optical signal from the image sequence;

(1-2-2) detecting the optical signal reflecting off the detected region of interest, for each individual image constituting the image sequence;

(1-2-3) converting the detected optical signal into electric charge;

(1-2-4) calculating a subcutaneous blood flow change from a signal resulting from conversion into the electric charge; and (1-2-5) converting the subcutaneous blood flow change into a frequency signal and outputting the frequency signal as the pulse wave signal, thereby extracting the pulse wave signal.

More preferably, in the step (1-2-1), the region of interest is detected using a detection model trained on the basis of an artificial intelligence algorithm to detect regions of interest for pulse wave signal extraction from images of people.

Advantageous Effects

In estimating blood pressure, the webcam for obtaining a video, that is, an image sequence, in a non-contact manner is used, so that blood pressure can be estimated continuously during the recording with the webcam without contact with a device or another person. In addition, blood pressure is estimated just by being in front of the webcam, so the system is easy to use, inexpensive, and can secure sufficient precision by using a neural network algorithm.

DESCRIPTION OF THE REFERENCE NUMERALS IN THE DRAWINGS

Figure 1:
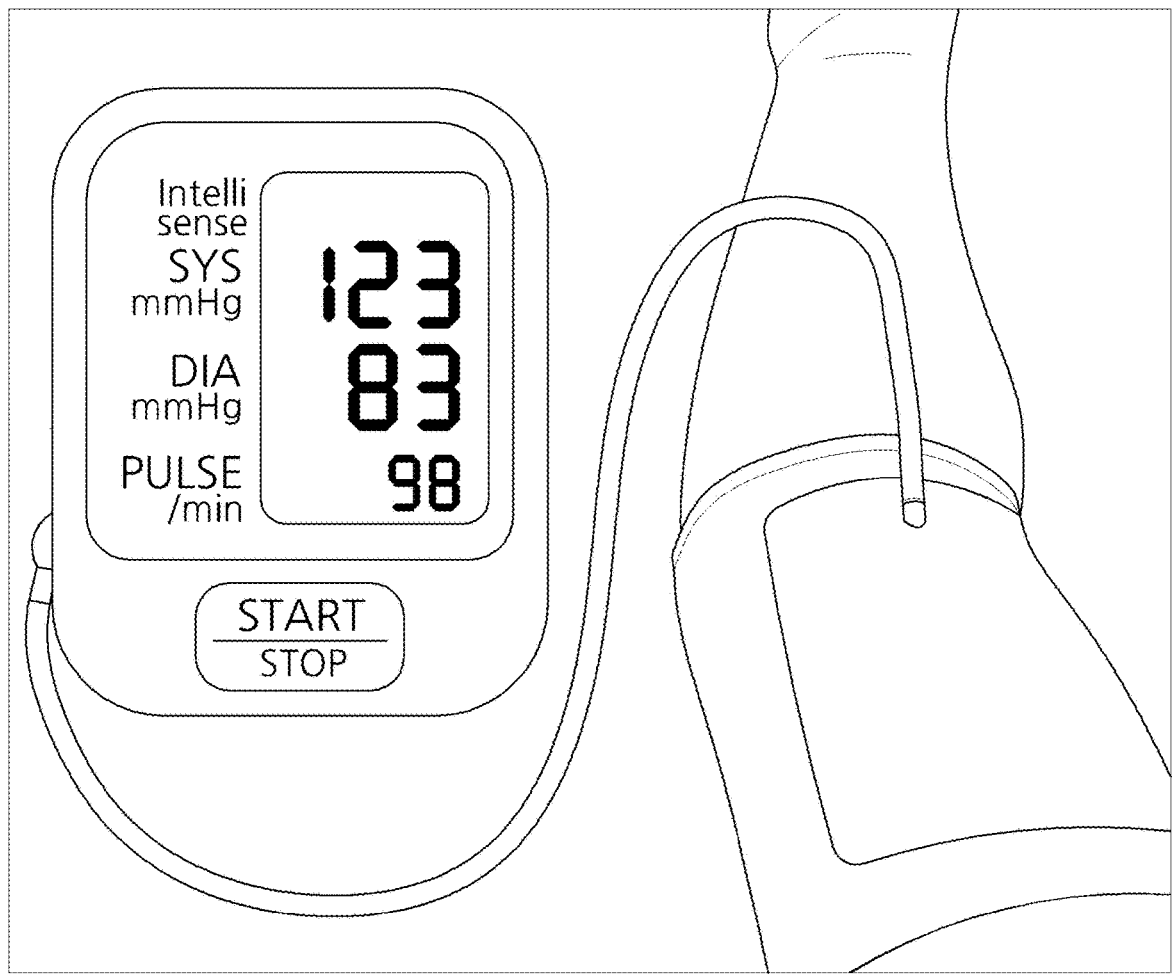
FIG. 1 is a diagram illustrating an example of conventional blood pressure measurement.

100: learning part
110: data collection module
120: pulse wave extraction module
130: feature extraction module
140: model creation module
200: prediction part
300: webcam
400: sphygmomanometer
500: database
600: output part
S100: creating blood pressure measurement model based on neural network using image sequence obtained by webcam in non-contact manner
S110: collecting image sequence obtained by webcam in non-contact manner and storing same in database
S120: extracting pulse wave from image sequence stored in database
S121: detecting region of interest for extracting optical signal from image sequence
S122: detecting optical signal reflecting off detected region of interest, for each individual image constituting image sequence
S123: converting detected optical signal into electric charge
S124: calculating subcutaneous blood flow change from signal resulting from conversion into electric charge
S125: converting subcutaneous blood flow change into frequency signal and outputting frequency signal as pulse wave signal
S130: extracting feature values from extracted pulse wave
S140: performing neural network training using extracted feature values, and creating blood pressure measurement model for predicting blood pressure from feature values
S200: receiving image sequence of measurement subject obtained by webcam, and using blood pressure measurement model to estimate blood pressure of measurement subject Best Mode Hereinafter, preferred embodiments of the present disclosure will be described in detail with reference to the accompanying drawings such that the present disclosure can be easily embodied by those skilled in the art to which the present disclosure belongs. However, in describing the preferred embodiments of the present disclosure in detail, if it is decided that a detailed description of the known function or configuration related to the present disclosure makes the subject matter of the present disclosure unclear, the detailed description will be omitted. In addition, throughout the drawings, the same reference numerals are used for parts having similar functions and operations.

Throughout the specification, when a part is referred to as being 'connected' to another part, it includes not only being 'directly connected', but also being 'indirectly connected' by interposing the other part therebetween. In addition, when a part 'includes' an element, this means that it further includes other elements, but does not exclude other elements, unless specifically stated otherwise.

Figure 2:
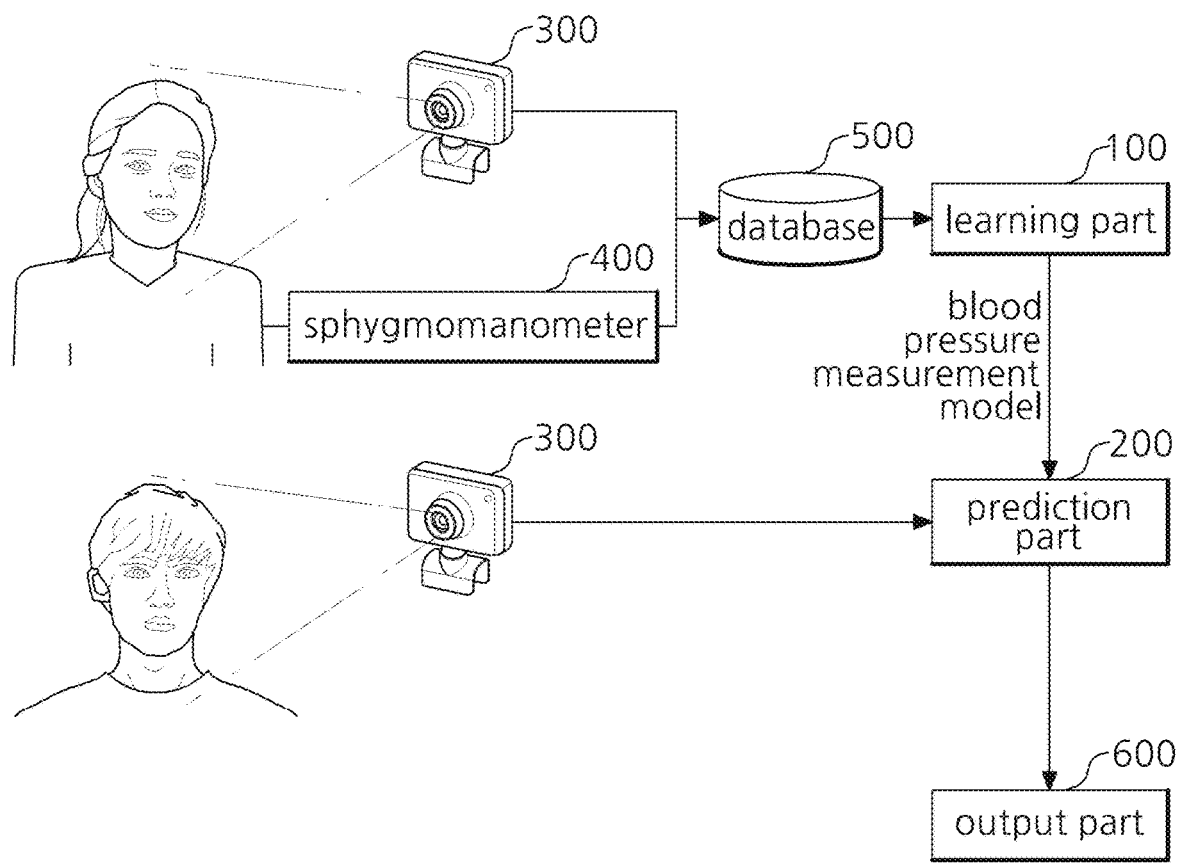
FIG. 2 is a diagram illustrating a configuration of a non-contact image-based blood pressure measurement system based on advanced visual intelligence according to an embodiment of the present disclosure.

FIG. 2 is a diagram illustrating a configuration of a non-contact image-based blood pressure measurement system based on advanced visual intelligence according to an embodiment of the present disclosure. As shown in FIG. 2, a non-contact image-based blood pressure measurement system based on advanced visual intelligence according to an embodiment of the present disclosure may include a learning part 100 and a prediction part 200. Data measured by a webcam 300 and a sphygmomanometer 400 may be stored in a database 500. The learning part 100 may perform neural network training with the data stored in the database 500 to create a blood pressure measurement model. The prediction part 200 may use the blood pressure measurement model to estimate blood pressure from an image sequence obtained by the webcam 300. The estimated blood pressure may be output through an output part 600.

That is, a non-contact image-based blood pressure measurement system based on advanced visual intelligence according to an embodiment of the present disclosure creates a blood pressure measurement model by performing neural network training with an image sequence obtained by a webcam 300 in a non-contact manner, and estimates the blood pressure of a measurement subject with the blood pressure measurement model. Accordingly, since the system uses the webcam 300 for obtaining a video, that is, an image sequence, in a non-contact manner, blood pressure is estimated continuously during the recording with the webcam 300 without contact with a device or another person, and blood pressure is estimated just by being in front of the webcam 300, so the system is easy to use, inexpensive, and secures sufficient precision by using a neural network algorithm.

In particular, a non-contact image-based blood pressure measurement system based on advanced visual intelligence according to an embodiment of the present disclosure may use features of pulse wave extracted from an image sequence as feature values for neural network training. That is, since the amplitude and wavelength of pulse wave are directly affected by the cardiovascular system, blood pressure is calculated using a correlation between the blood pressure and the factors.

One method may be to use pulse transit time (PTT) as a main training factor for blood pressure estimation. PTT is the time that it takes for a pulse to travel from the heart to each body part. Factors that affect PTT include blood viscosity, blood volume, blood vessel elasticity, and blood pressure. The most influential factor is blood pressure. Based on this, PTT to each body part is measured, and difference values are used to infer blood pressure.

In one study, photoplethysmographic signals simultaneously recorded from the fingers of both hands were used to estimate blood pressure values, wherein measurement was performed using PTT. In some other studies, a single photoplethysmogram graph waveform was used for blood pressure estimation by setting a linear correlation between blood pressure and features, such as a systolic amplitude and the duration between each peak.

Figure 3:
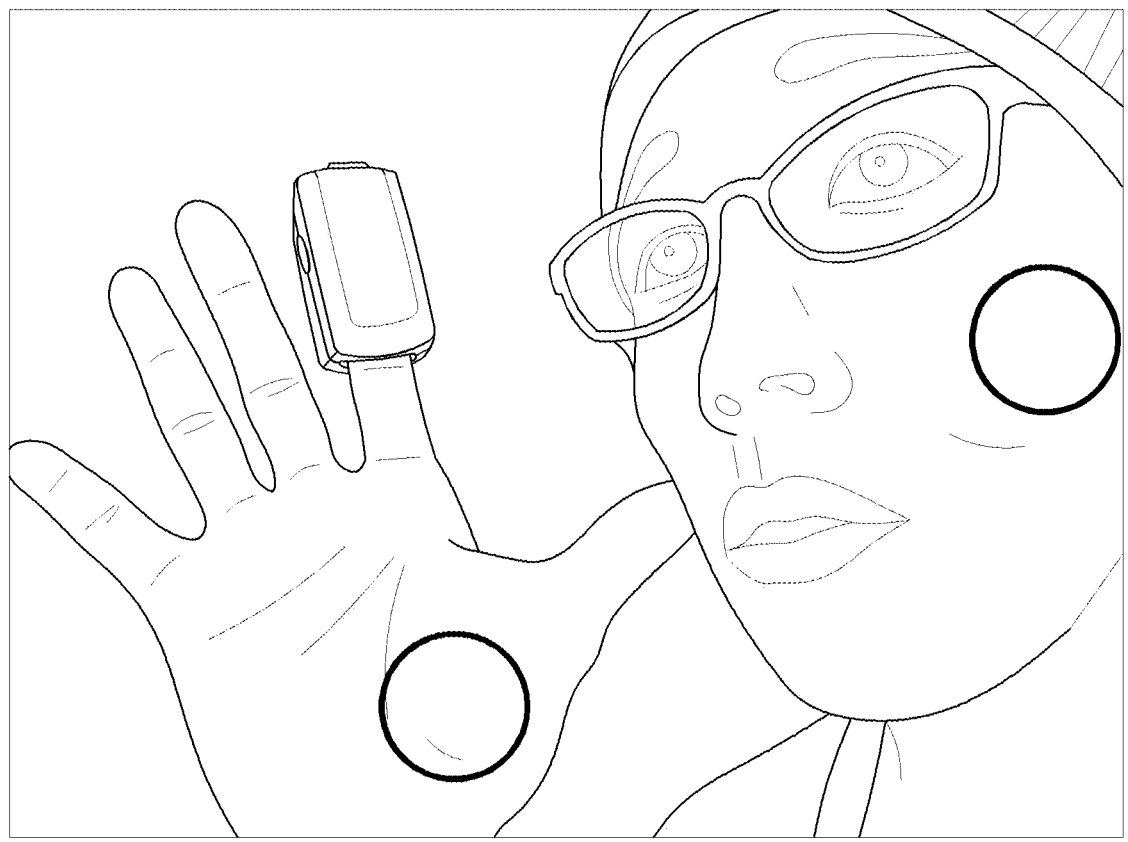
FIGS. 3 and 4 are diagrams illustrating an example of blood pressure measurement using PPT.
Figure 4:
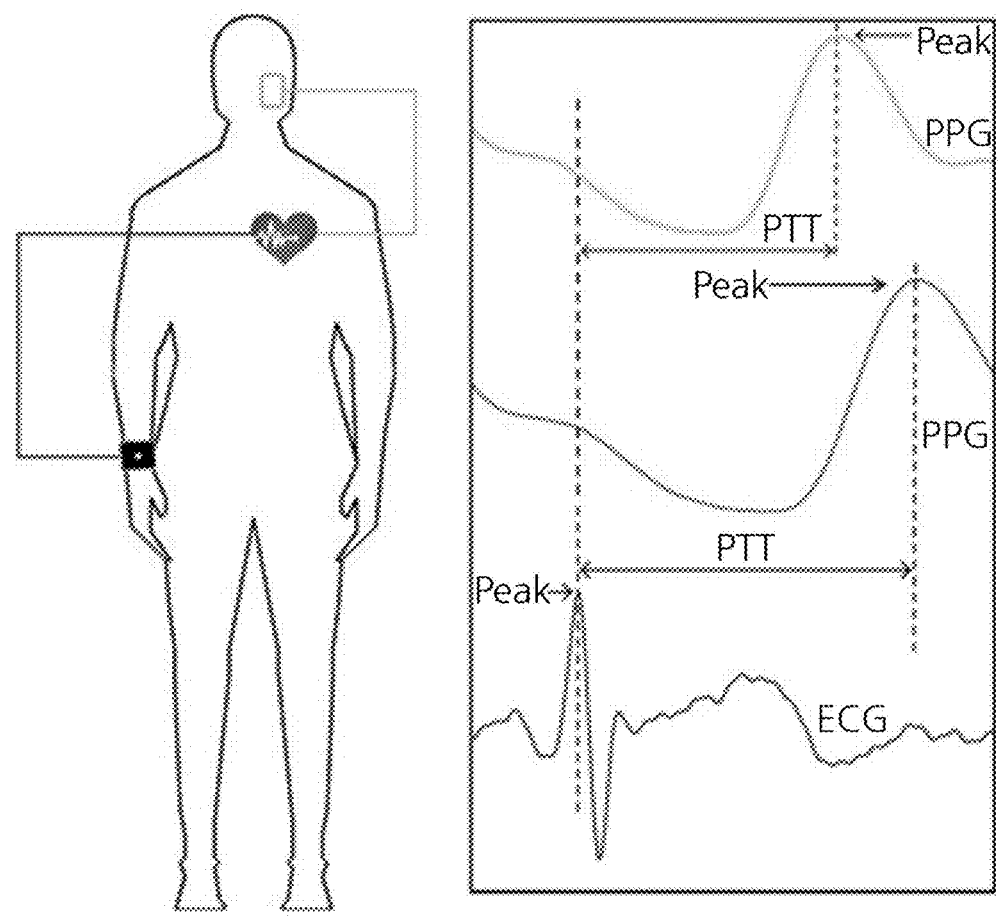

FIGS. 3 and 4 are diagrams illustrating an example of blood pressure measurement using PPT. As shown in FIGS. 3 and 4, PTT is extracted from data measured by a photoplethysmograph at the extremity of the body and an image of the face, and the extracted PPT is used to estimate blood pressure. More specifically, a distance is calculated on the basis of PPT, and 10 data features closest to a test case are found to average target results, thereby obtaining a final predicted blood pressure. However, in this case of the method, sensitivity may be overly high because a single factor, PTT, is used. The factor is a secondarily processed factor based on the state of the cardiovascular system, so other factors besides blood pressure may have influence, thus reducing the accuracy of the final predicted blood pressure.

Therefore, in a non-contact image-based blood pressure measurement system based on advanced visual intelligence according to an embodiment of the present disclosure, feature values are directly extracted from pulse wave to perform neural network training, instead of using PTT as feature values for training.

To estimate blood pressure, feature values, such as systolic upstroke time, diastolic time, width ⅔, and ½ pulse height, are extracted from a photoplethysmogram waveform and used. The feature values may be extracted by applying a normalization technique extracted by fast Fourier transform and used.

Hereinafter, each of the elements constituting a non-contact image-based blood pressure measurement system based on advanced visual intelligence according to an embodiment of the present disclosure will be described in detail.

A learning part 100 may create a blood pressure measurement model based on a neural network using an image sequence obtained by a webcam 300. A detailed configuration of the learning part 100 will be described later with reference to FIG. 5.

A prediction part 200 may receive an image sequence of a measurement subject obtained by the webcam 300, and may use the blood pressure measurement model created by the learning part 100 to estimate the blood pressure of the measurement subject. That is, the prediction part 200 performs prediction of estimating the blood pressure of a real measurement subject by using a training result of the learning part 100. As shown in FIG. 2, the prediction part may input the image sequence of the measurement subject to the blood pressure measurement model to output blood pressure.

A webcam 300 may obtain an image sequence in a non-contact manner. Herein, an image of a person's face may be taken. The webcam 300 may be realized as a camera provided in a computer, a laptop computer, a tablet PC, or a portable terminal, and may obtain a video, that is, an image sequence, in a non-contact manner. The image sequence obtained by the webcam 300 may be transmitted over a wired/wireless network and stored in a database 500. Herein, a large number of image sequences of people of different sexes and ages and in different lighting conditions may be collected for training data collection.

A sphygmomanometer 400 may be a device for measuring blood pressure in various ways, such as invasive, non-invasive, and contact. Herein, the sphygmomanometer 400 is for supervised learning, and may measure blood pressure while the webcam 300 obtains an image sequence when training data is collected, and may input the measured blood pressure as a correct answer to be output from the blood pressure measurement model.

A database 500 may store an image sequence obtained by the webcam 300. An image sequence preprocessed to enable neural network training may be stored as training data, and an image sequence and blood pressure may be matched and stored as training data. The database 500 may provide the stored training data to the learning part 100 so that neural network training is performed. In addition, the database 500 may store an image sequence of a measurement subject used for blood pressure prediction by the prediction part 200, and a prediction result.

An output part 600 outputs a prediction result of the prediction part 200 and provides the same to a user, such as a measurement subject or a medical worker, and may be realized as an electronic device that the user uses. Herein, the output part 600 may output the blood pressure estimated by the prediction part 200 and a training process and result of the learning part 100 in various ways, such as text, graphs, and images.

Herein, the electronic devices may include at least one of the following: a smartphone, a tablet personal computer (PC), a mobile phone, a video phone, an e-book reader, a desktop PC, a laptop PC, a netbook computer, a workstation, a server, a personal digital assistant (PDA), a media box, a game console, an electronic dictionary, and a wearable device. Examples of the wearable device may include at least one of the following: an accessory type (e.g., a watch, ring, bracelet, anklet, necklace, glasses, contact lens, or a head-mounted device (HMD)), a fabric or clothing-integrated type (e.g., electronic clothing), a body-attachable type (e.g., a skin pad or tattoo), and an implantable circuit. In various embodiments, the electronic devices are not limited to the aforementioned devices, and may be a combination of two or more of the aforementioned various devices.

Figure 5:
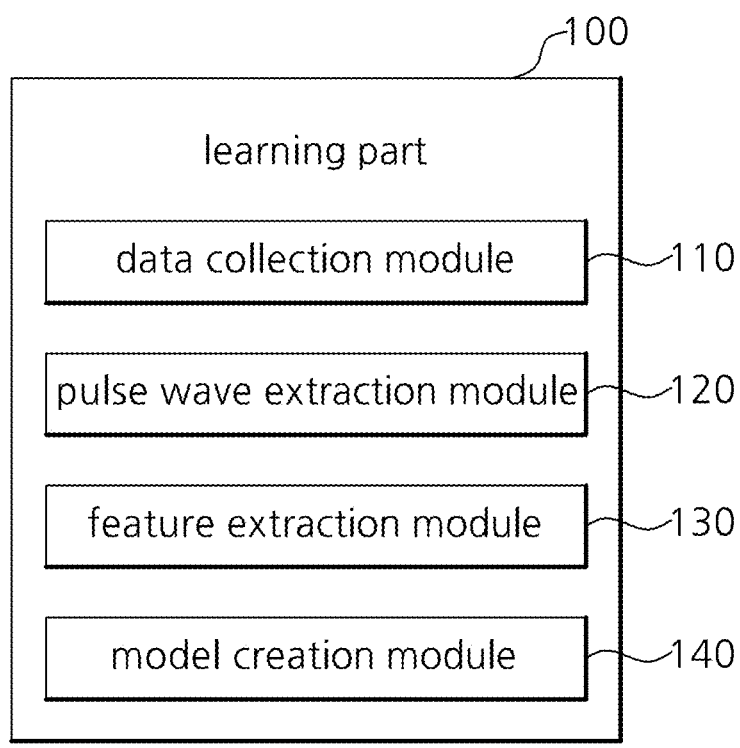
FIG. 5 is a diagram illustrating a detailed configuration of a learning part in a non-contact image-based blood pressure measurement system based on advanced visual intelligence according to an embodiment of the present disclosure.

FIG. 5 is a diagram illustrating a detailed configuration of a learning part 100 in a non-contact image-based blood pressure measurement system based on advanced visual intelligence according to an embodiment of the present disclosure. As shown in FIG. 5, a learning part 100 of a non-contact image-based blood pressure measurement system based on advanced visual intelligence according to an embodiment of the present disclosure may include: a data collection module 110 for collecting an image sequence obtained by a webcam 300 in a non-contact manner and storing the image sequence in a database 500; a pulse wave extraction module 120 for extracting pulse wave from the image sequence stored in the database 500; a feature extraction module 130 for extracting feature values from the extracted pulse wave; and a model creation module 140 for performing neural network training using the extracted feature values, and creating a blood pressure measurement model for predicting blood pressure from the feature values.

Figure 6:
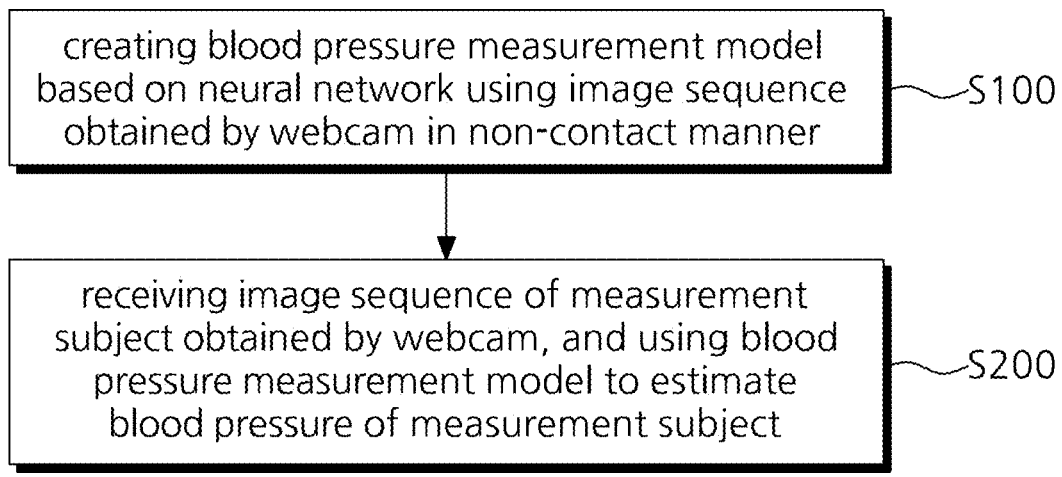
FIG. 6 is a diagram illustrating a flow of a non-contact image-based blood pressure measurement method based on advanced visual intelligence according to an embodiment of the present disclosure.

FIG. 6 is a diagram illustrating a flow of a non-contact image-based blood pressure measurement method based on advanced visual intelligence according to an embodiment of the present disclosure. As shown in FIG. 6, a non-contact image-based blood pressure measurement method based on advanced visual intelligence according to an embodiment of the present disclosure is a non-contact image-based blood pressure measurement method of which each step is performed by a computer, and includes: creating a blood pressure measurement model based on a neural network using an image sequence obtained by a webcam 300 in a non-contact manner in step S100; and receiving an image sequence of a measurement subject obtained by the webcam 300, and using the blood pressure measurement model to estimate blood pressure of the measurement subject in step S200.

The present disclosure relates to non-contact image-based blood pressure measurement method based on advanced visual intelligence, which may be configured as software recorded on hardware including a memory and a processor. For example, a non-contact image-based blood pressure measurement method based on advanced visual intelligence according to an embodiment of the present disclosure includes steps each performed by a computer, such as a personal computer, a laptop computer, a server computer, a PDA, a smartphone, or a tablet PC, and may be stored and realized on the computer. Hereinafter, for convenience of description, a subject performing each step may be omitted.

In step S100, a learning part 100 may create a blood pressure measurement model based on a neural network using an image sequence obtained by a webcam 300 in a non-contact manner. A detailed flow of step S100 will be described later with reference to FIG. 7.

In step S200, a prediction part 200 may receive an image sequence of a measurement subject obtained by the webcam 300, and may use the blood pressure measurement model created in step S100 to estimate the blood pressure of the measurement subject.

Figure 7:
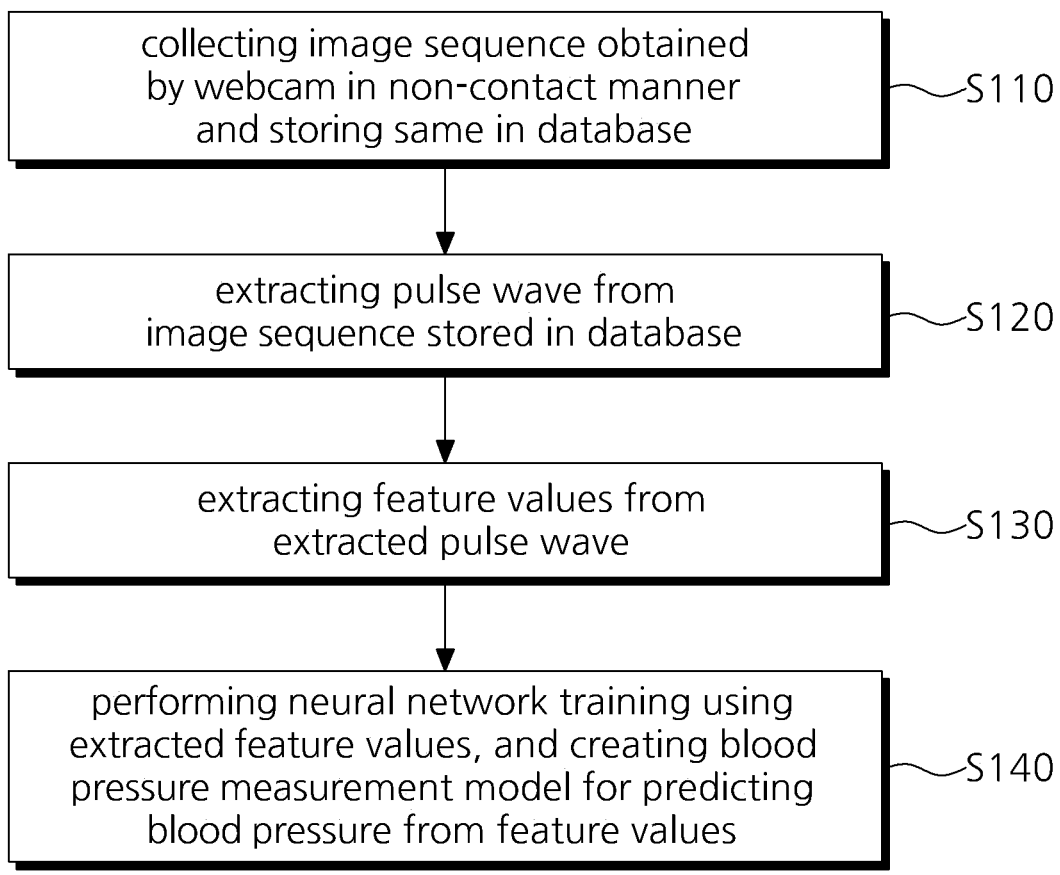
FIG. 7 is a diagram illustrating a detailed flow of step S100 in a non-contact image-based blood pressure measurement method based on advanced visual intelligence according to an embodiment of the present disclosure.

FIG. 7 is a diagram illustrating a detailed flow of step S100 in a non-contact image-based blood pressure measurement method based on advanced visual intelligence according to an embodiment of the present disclosure. As shown in FIG. 7, step S100 of a non-contact image-based blood pressure measurement method based on advanced visual intelligence according to an embodiment of the present disclosure may include: collecting an image sequence obtained by a webcam 300 in a non-contact manner and storing the image sequence in a database 500 in step S110; extracting pulse wave from the image sequence stored in the database 500 in step S120; extracting feature values from the extracted pulse wave in step S130; and performing neural network training using the extracted feature values, and creating a blood pressure measurement model for predicting blood pressure from the feature values in step S140.

In step S110, a data collection module 110 of a learning part 100 may collect an image sequence obtained by the webcam 300 in a non-contact manner and may store the same in the database 500. More specifically, in step S110, blood pressure measured while the image sequence is collected with the webcam 300 may be collected, and the image sequence and the blood pressure may be matched and stored as training data in the database 500. That is, as shown in FIG. 2, the webcam 300 and a sphygmomanometer 400 may be used to collect training data and the training data may be stored in the database 500.

In step S140, which will be described in detail later, supervised learning is performed with the training data stored in the database 500. Using the feature values extracted from the image sequence as input data and using the blood pressure as output data, the blood pressure measurement model may be created by performing neural network training so that a correlation between the feature values and the blood pressure is understood.

In step S120, a pulse wave extraction module 120 may extract pulse wave from the image sequence stored in the database 500. Herein, the pulse wave may be photoplethysmogram (PPG) pulse wave. More specifically, in step S120, a pulse wave signal is extracted from the image sequence, wherein the pulse wave signal may be extracted from a region of interest included in the image sequence. Hereinafter, a detailed flow of step S120 will be described with reference to FIG. 8.

Figure 8:
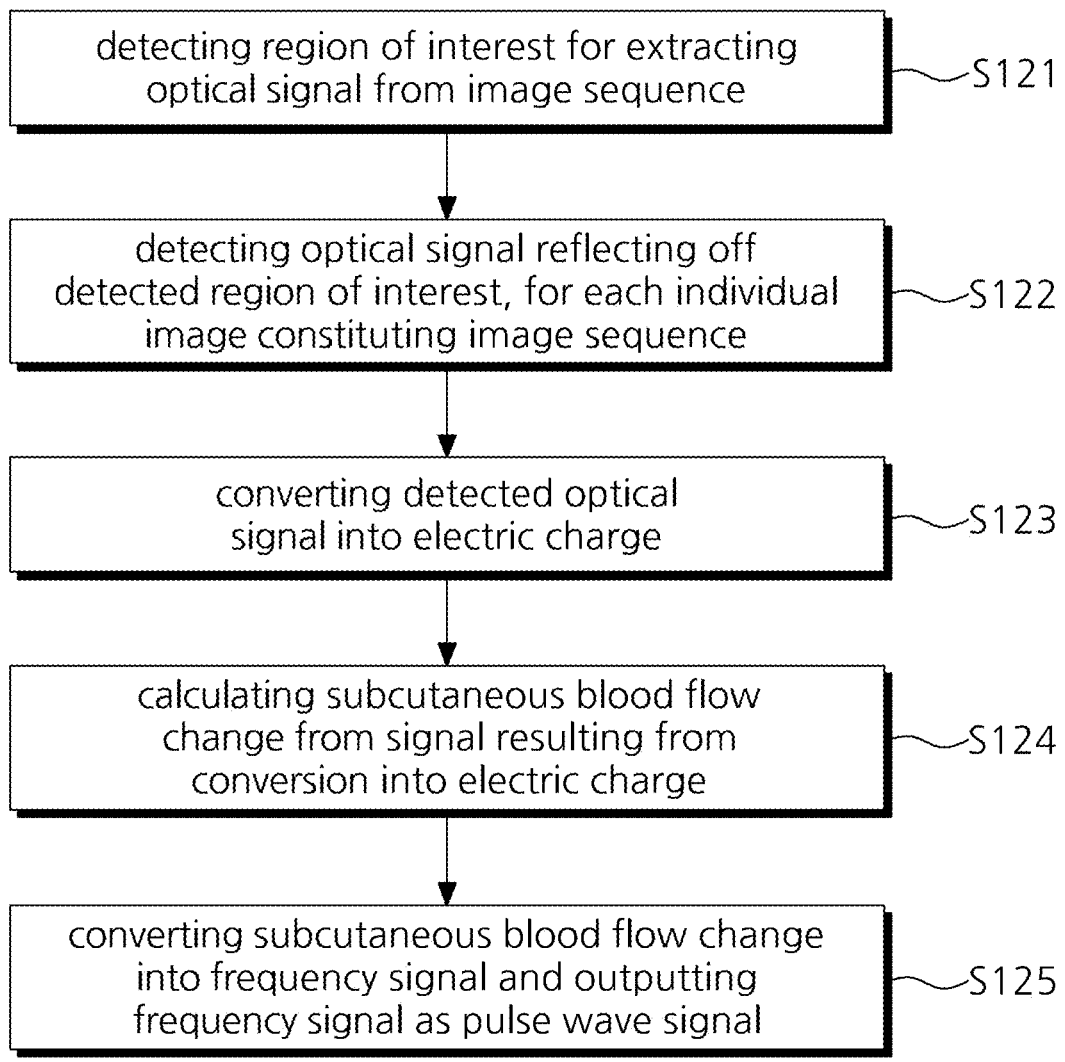
FIG. 8 is a diagram illustrating a detailed flow of step S120 in a non-contact image-based blood pressure measurement method based on advanced visual intelligence according to an embodiment of the present disclosure.

FIG. 8 is a diagram illustrating a detailed flow of step S120 in a non-contact image-based blood pressure measurement method based on advanced visual intelligence according to an embodiment of the present disclosure. As shown in FIG. 8, step S120 of a non-contact image-based blood pressure measurement method based on advanced visual intelligence according to an embodiment of the present disclosure may include: detecting a region of interest for extracting an optical signal from an image sequence in step S121; detecting the optical signal reflecting off the detected region of interest, for each individual image constituting the image sequence in step S122; converting the detected optical signal into electric charge in step S123; calculating a subcutaneous blood flow change from a signal resulting from conversion into the electric charge in step S124; and converting the subcutaneous blood flow change into a frequency signal and outputting the frequency signal as a pulse wave signal in step S125.

In step S121, the region of interest for extracting the optical signal may be detected from the image sequence. More specifically, in step S121, the region of interest may be detected using a detection model trained on the basis of an artificial intelligence algorithm to detect regions of interest for pulse wave signal extraction from images of people. Herein, the detection model may be a model trained to detect a region of interest from an image sequence of the webcam 300 on the basis of a neural network model, such as a convolutional neural network (CNN), yolov3, or ResNet, with good performance in image processing.

That is, in step S121, a face region of a target person is recognized from the image sequence, feature points are detected from the recognized face region, valid feature points effective for pulse wave signal detection are extracted among the feature points, and a region determined by the valid feature points may be detected as the region of interest.

In step S122, the optical signal reflecting off the detected region of interest may be detected for each individual image constituting the image sequence. Herein, in step S122, optical signal values separated by color channels of red, green, and blue may be detected from the individual images constituting the image sequence.

In step S123, the detected optical signal may be converted into the electric charge. Herein, a photoelectric conversion element may be used to convert the optical signal into the electric charge, and more specifically, a photodiode may be used.

In step S124, the subcutaneous blood flow change may be calculated from the signal resulting from conversion into the electric charge. That is, the subcutaneous blood flow change may be calculated using the feature that there is a correlation between the intensity of the optical signal detected in step S122 and the subcutaneous reflectance according to the blood flow change of the person obtained in the image sequence.

In step S125, the subcutaneous blood flow change may be converted into the frequency signal and the frequency signal may be output as the pulse wave signal. That is, the subcutaneous blood flow change calculated in step S124 may be converted into the frequency signal in a frequency domain and the frequency signal may be output as the pulse wave signal. In addition, in step S125, the frequency signal resulting from conversion may be filtered to remove noise and amplified to output the pulse wave signal.

In step S130, a feature extraction module 130 may extract the feature values from the extracted pulse wave. More specifically, the feature values extracted in step S130 may include at least two selected from the group of a systolic amplitude, a pulse interval, a systolic slope, a diastolic slope, a peak interval, a pulse wave rise time, and a pulse wave fall time.

Figure 9:
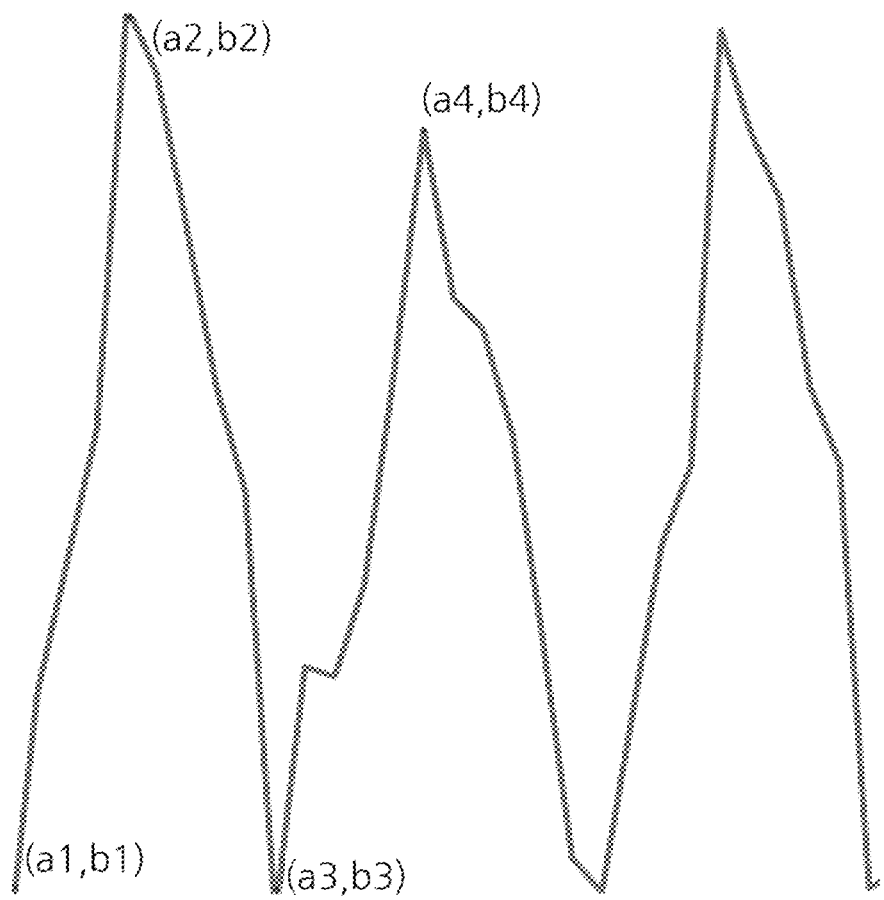
FIG. 9 is a diagram illustrating feature value extraction in step S130 of a non-contact image-based blood pressure measurement method based on advanced visual intelligence according to an embodiment of the present disclosure.

FIG. 9 is a diagram illustrating feature value extraction in step S130 of a non-contact image-based blood pressure measurement method based on advanced visual intelligence according to an embodiment of the present disclosure. In step S130 of a non-contact image-based blood pressure measurement method based on advanced visual intelligence according to an embodiment of the present disclosure, as shown in FIG. 9, four points at (a1, b1), (a2, b2), (a3, b3), and (a4, b4) may be selected from a graph of pulse wave expressed on a 2D coordinate plane, and the systolic amplitude (b2−b1), the pulse interval (a3−a1), the systolic slope ((b2−b1)/(a2−a1)), the diastolic slope ((b3−b2)/(a3−a2)), the peak interval (a4−a2), the pulse wave rise time (a2−a1), and the pulse wave fall time (a3−a2) may be calculated, and these may be used as feature values for training. In this way, the feature values are extracted using the coordinate values of the maximum and the minimum peak, thus extracting accurate feature values.

In step S140, a model creation module 140 may perform neural network training using the extracted feature values, and may create a blood pressure measurement model for predicting blood pressure from the feature values. More specifically, in step S140, the feature values extracted in step S130 may be organized into one vector, and the vector may be input to a neural network model to perform training.

Herein, the blood pressure measurement model may be created by performing neural network training on a long short-term memory (LSTM) recurrent neural network (RNN). That is, in the present disclosure, an image sequence obtained by the webcam 300 is used to extract feature values from pulse wave that represents waveform changing over time, and RNN, one of the DNN structures, has excellent performance in classifying and analyzing such time-series information.

Figure 10:
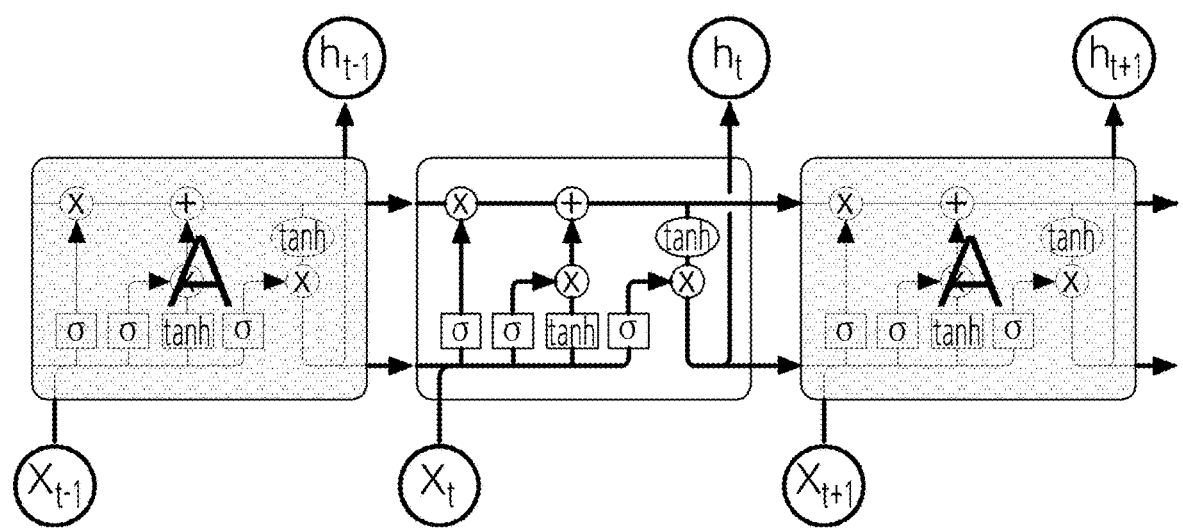
FIG. 10 is a diagram illustrating an LSTM RNN used in a non-contact image-based blood pressure measurement method based on advanced visual intelligence according to an embodiment of the present disclosure.

FIG. 10 is a diagram illustrating an LSTM RNN used in a non-contact image-based blood pressure measurement method based on advanced visual intelligence according to an embodiment of the present disclosure. As shown in FIG. 10, especially in an LSTM among RNN structures, a forget gate is configured for each step, so performance may be improved through a long short-term memory structure that enables the current state to be affected by old input data. In step S140, such an LSTM structure may be trained with training data to create a blood pressure measurement model for continuously estimating blood pressure from an image sequence obtained by the webcam 300.

In the meantime, in a non-contact image-based blood pressure measurement method based on advanced visual intelligence according to an embodiment of the present disclosure, transfer learning may be used. Transfer learning is the reuse of a pre-trained model for a new problem. Since an already trained model is used, a neural network is deeply trained with relatively little data. In addition, it is also useful because most real problems do not typically have millions of labeled data to train complex models.

In the present disclosure, using such transfer learning, a blood pressure measurement model specialized for blood pressure measurement may be created from a model previous trained with a large amount of training data. According to some embodiments, a blood pressure measurement model optimized for an individual measurement subject may be created using transfer learning from a general blood pressure measurement model, or measurement subjects are grouped by sex, age group, and disease to create a blood pressure measurement model for each group, thereby estimating blood pressure precisely according to body information of a measurement subject.

As described above, according to a non-contact image-based blood pressure measurement method and system based on advanced visual intelligence proposed in the present disclosure, a blood pressure measurement model is created by performing neural network training with an image sequence obtained by a webcam 300 in a non-contact manner, and the blood pressure of a measurement subject is estimated with the blood pressure measurement model. Accordingly, since the webcam 300 for obtaining a video, that is, an image sequence, in a non-contact manner is used, blood pressure may be continuously estimated during the recording with the webcam 300 without contact with a device or another person, and blood pressure may be estimated just by being in front of the webcam 300, so the system is easy to use, inexpensive, and may secure sufficient precision by using a neural network algorithm.

In the meantime, the present disclosure may include a computer-readable recording medium including program commands for performing operations implemented by various communication terminals. Examples of the computer-readable recording medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction.

The computer-readable recording medium may include program commands, data files, data structures, and the like separately or in combinations. Herein, the program commands being recorded in the computer-readable medium may correspond to a program command that is specifically designed and configured for the embodiments of the present disclosure, or the program command may correspond to a program command that is disclosed and available to anyone skilled in or related to computer software. For example, the program commands may include machine language codes 1, which are created by a compiler, as well as high-level language codes 1, which may be executed by a computer by using an interpreter.

Various modifications or applications of the above-described present disclosure may be made by those skilled in the art to which the present disclosure belongs, and the scope of the technical idea according to the present disclosure should be defined by the following claims.

The invention claimed is:

1. A non-contact image-based blood-pressure-measurement method comprising:
   (a) creating, by a computer, a blood-pressure measurement model based on a neural network using an image sequence obtained by a webcam without physical contact; and
   (b) receiving an image sequence of a measurement subject obtained by the webcam and estimating the subject's blood pressure with the blood-pressure-measurement model,
   wherein the step (a) comprises:
   (i) collecting the image sequence and storing it in a database;
   (ii) extracting a pulse-wave signal from the stored image sequence, the extracting including:
      (A) detecting a region of interest from the image sequence;
      (B) obtaining an optical signal reflected from the detected region of interest;
      (C) converting the optical signal into electric charge by a photoelectric-conversion process;
      (D) calculating subcutaneous blood-flow variation from the electric-charge signal; and
      (E) converting the subcutaneous blood-flow variation into a frequency-domain signal corresponding to the pulse-wave;
   (iii) extracting feature values from the pulse-wave signal, the feature values including at least two selected from a group consisting of a systolic amplitude, a pulse interval, a systolic slope, a diastolic slope, a peak interval, a pulse-wave rise time, and a pulse-wave fall time; and
   (iv) training a long-short-term-memory (LSTM) recurrent neural network using the extracted feature values and corresponding reference blood-pressure data to create the blood-pressure-measurement model for predicting blood pressure from the feature values.

2. The method of claim 1, wherein in the step (i), blood pressure measured while the image sequence is collected with the webcam is collected, and the image sequence and the blood pressure are matched and stored as training data in the database.

3. The method of claim 2, wherein in the step (iv), supervised learning is performed with the training data stored in the database, and using the feature values extracted from the image sequence as input data and using the blood pressure as output data, the blood pressure measurement model is created by performing neural network training so that a correlation between the feature values and the blood pressure is understood.

4. The method of claim 1, wherein in the step (ii), a pulse-wave signal is extracted from the image sequence, and the pulse-wave signal is extracted from a region of interest included in the image sequence.

5. The method of claim 4, wherein the step (ii) comprises:
   (a1) detecting the region of interest for extracting an optical signal from the image sequence;
   (b1) detecting the optical signal reflecting off the detected region of interest, for each individual image constituting the image sequence;
   (c1) converting the detected optical signal into electric charge;
   (d1) calculating a subcutaneous blood flow change from a signal resulting from conversion into the electric charge; and
   (e1) converting the subcutaneous blood flow change into a frequency signal and outputting the frequency signal as the pulse-wave signal.

6. The method of claim 5, wherein in the step (a1), the region of interest is detected using a detection model trained on the basis of an artificial intelligence algorithm to detect regions of interest for pulse-wave signal extraction from images of people.

7. A non-contact image-based blood-pressure-measurement system comprising:
   (a) a webcam configured to obtain an image sequence without physical contact;
   (b) a learning unit configured to create a blood-pressure-measurement model based on a long-short-term-memory recurrent neural network using the image sequence obtained by the webcam, the learning unit including:
      (i) a data-collection module for collecting the image sequence and storing it in a database together with reference blood-pressure values;
      (ii) a pulse-wave-extraction module for performing the sequence of operations of detecting a region of interest, obtaining an optical signal, converting the optical signal into electric charge, calculating subcutaneous blood-flow variation, and converting the variation into a frequency-domain pulse-wave signal;
      (iii) a feature-extraction module for extracting at least two of the features selected from the group consisting of a systolic amplitude, a pulse interval, a systolic slope, a diastolic slope, a peak interval, a pulse-wave rise time, and a pulse-wave fall time; and
      (iv) a model-creation module for training the LSTM recurrent neural network using the extracted feature values and the reference blood-pressure values; and
   (c) a prediction unit configured to receive an image sequence of a measurement subject obtained by the webcam and to estimate the blood pressure of the subject using the blood-pressure-measurement model.

8. The system of claim 7, wherein the data collection module is configured to collect blood pressure measured while the image sequence is collected with the webcam, and match and store the image sequence and the blood pressure as training data in the database.

9. The system of claim 8, wherein the model creation module is configured to perform supervised learning with the training data stored in the database, and create the blood pressure measurement model by performing neural network training so that a correlation between the feature values and the blood pressure is understood, with the feature values extracted from the image sequence as input data and with the blood pressure as output data.

10. The system of claim 7, wherein the pulse wave extraction module is configured to extract a pulse-wave signal from the image sequence, and extract the pulse-wave signal from a region of interest included in the image sequence.

11. The system of claim 10, wherein the pulse wave extraction module is configured to extract the pulse-wave signal by following the steps of
   (a1) detecting the region of interest for extracting an optical signal from the image sequence;
   (b1) detecting the optical signal reflecting off the detected region of interest, for each individual image constituting the image sequence;
   (c1) converting the detected optical signal into electric charge;

(d1) calculating a subcutaneous blood flow change from a signal resulting from conversion into the electric charge; and (e1) converting the subcutaneous blood flow change into a frequency signal and outputting the frequency signal as the pulse-wave signal.

12. The system of claim 11, wherein in the step (a1), the region of interest is detected using a detection model trained on the basis of an artificial intelligence algorithm to detect regions of interest for pulse-wave signal extraction from images of people.

* * * * *